United States Patent
Underberg et al.

(10) Patent No.: US 7,992,703 B2
(45) Date of Patent: Aug. 9, 2011

(54) METHOD OF INTERFACING A TRANSFER PLATE TO A CONVEYOR BELT

(75) Inventors: Wesley J. Underberg, Germantown, WI (US); Edward A. Michalski, Mequon, WI (US)

(73) Assignee: Pro Engineering and Manufacturing, Inc., Milwaukee, WI (US)

( * ) Notice: Subject to any disclaimer, the term of this patent is extended or adjusted under 35 U.S.C. 154(b) by 0 days.

(21) Appl. No.: 12/657,220

(22) Filed: Jan. 15, 2010

(65) Prior Publication Data

US 2010/0115753 A1    May 13, 2010

Related U.S. Application Data

(62) Division of application No. 11/904,914, filed on Sep. 28, 2007, now Pat. No. 7,673,732.

(51) Int. Cl.
*B65G 47/66* (2006.01)
*B66B 29/08* (2006.01)
(52) U.S. Cl. .................... 198/600; 198/324
(58) Field of Classification Search ............ 198/324, 198/600
See application file for complete search history.

(56) References Cited

U.S. PATENT DOCUMENTS

| | | |
|---|---|---|
| 2,237,345 A | 4/1941 | Frentzel, Jr. et al. |
| 2,862,599 A | 12/1958 | Sinden et al. |
| 3,698,535 A | 10/1972 | Johnson |
| 4,088,219 A | 5/1978 | Binns |
| 5,215,182 A | 6/1993 | Garbagnati |
| 5,291,982 A | 3/1994 | Saito et al. |
| 5,611,417 A | 3/1997 | Stawniak et al. |
| 5,908,104 A | 6/1999 | Brun-Jarret |
| 5,971,129 A | 10/1999 | Stawniak et al. |
| 6,241,070 B1 | 6/2001 | Loder |
| 6,644,457 B2 | 11/2003 | Lauch |
| 2005/0016816 A1 | 1/2005 | Diaz |
| 2007/0044257 A1 | 3/2007 | Xu |

OTHER PUBLICATIONS

Rexnord FlatTop Europe B.V., MCC Finger Transfers Data Sheet, Date unknown, pp. 70-73.
Rexnord FlatTop Europe B.V., MCC Construction Details, Date unknown, pp. 20-21.
Rexnord FlatTop Europe B.V., Rex 5990 Series MatTop Chain Product Portfolio, Date unknown, pp. 11-12.
Rexnord FlatTop Europe B.V., Rex 8500 Series MatTop Chain Product Portfolio, Date unknown, p. 15.
Intralox, LLC, Product Line Extension-Series 1900 Flush Edge Raised Rib, Date unknown, p. 3.
USPTO Office Action dated Dec. 18, 2008 regarding U.S. Appl. No. 11/904,914, 9 pages.

*Primary Examiner* — Mark A Deuble
(74) *Attorney, Agent, or Firm* — Ryan Kromholz & Manion, S.C.

(57) ABSTRACT

A method according to the present invention includes providing a transfer plate used in conveying manufactured product or raw materials onto or off from a conveyor belt. Generally, the transfer plate includes a support member and a transfer extension depending from the support member to interface to a predetermined conveyor belt. The support member may be coupled to a support structure to allow multidirectional flotation, or acceptable operational movement, of the plate due to incidental movement of the conveyor belt. The method further includes the step of manually coupling the support member to the support structure, thereby preventing the need for tools during repair or replacement.

3 Claims, 8 Drawing Sheets

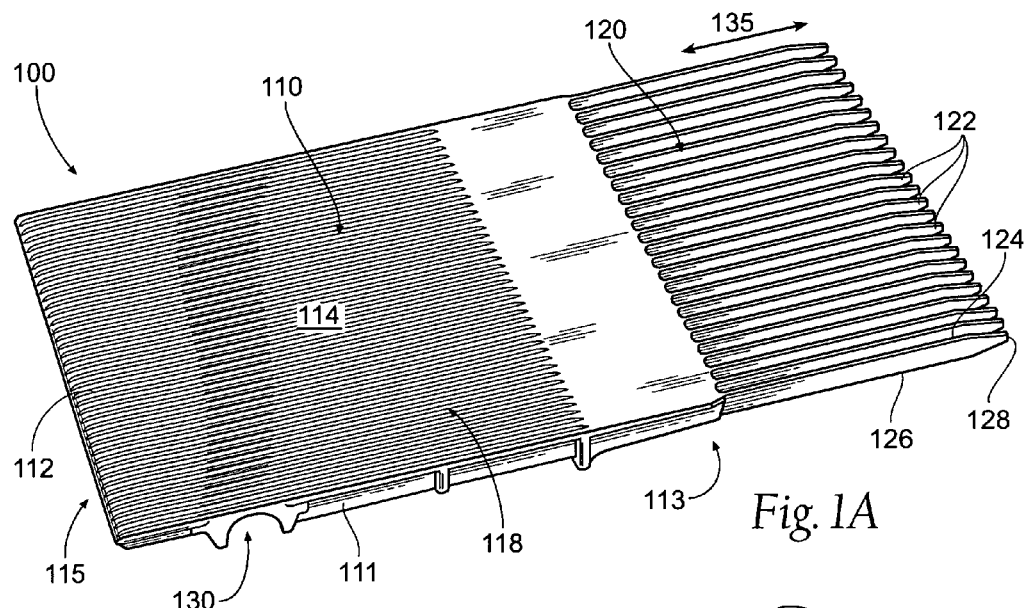
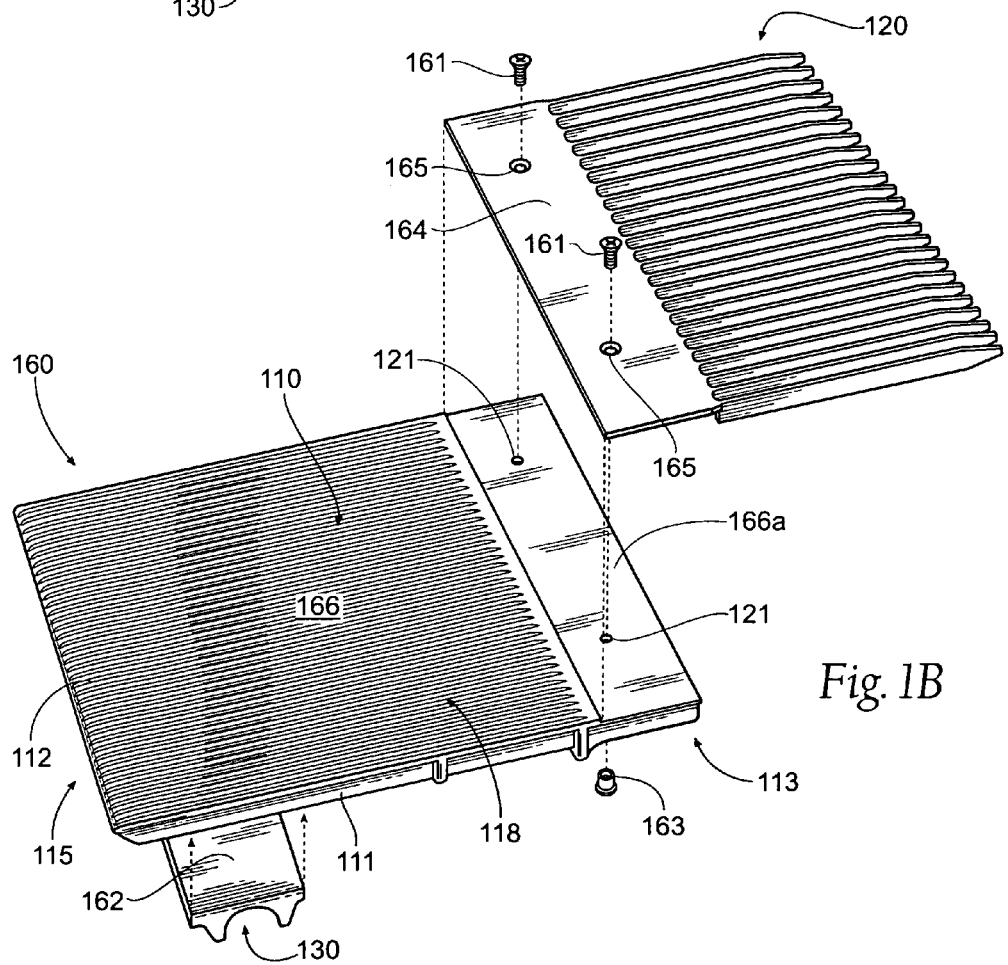

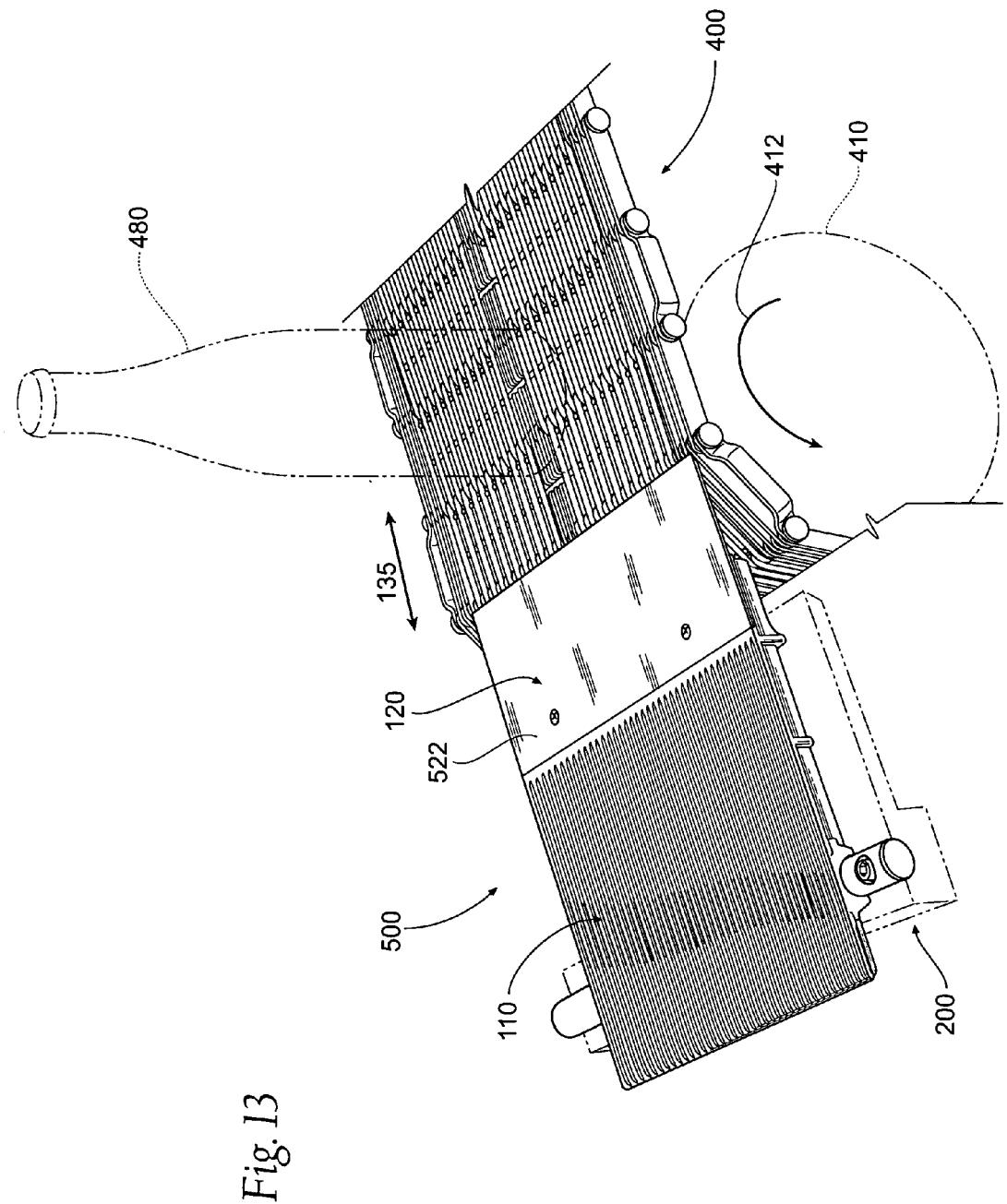

METHOD OF INTERFACING A TRANSFER PLATE TO A CONVEYOR BELT

RELATED APPLICATIONS

This is a divisional of U.S. patent application Ser. No. 11/904,914, filed 28 Sep. 2007 now U.S. Pat. No. 7,673,732.

BACKGROUND

The present invention relates generally to devices used in product manufacturing, and more particularly to a transfer plate for transferring products to or from a conveyor belt and a method of interfacing a transfer plate to a belt.

Various designs of transfer plates are currently employed in manufacturing processes, such as beverage bottling and canning processes, for example. A given manufacturing process or process step may dictate the type of conveyor belt to be used in a transfer process. Generally, like the present invention, prior transfer plates included a support plate and a transfer extension depending from the support plate. However, the support plates of prior devices were attached to a support structure, thereby maintaining the plate in a desired position. Such attachment was most often provided by way of threaded fasteners securing the support plate to the support structure at a desired location.

Mechanical fastening by way of threaded fasteners is undesirable for a variety of reasons. First, several plates may be placed side-by-side to span the entire width of a predetermined belt. Generally, use of threaded fasteners requires threaded receivers having nonvolatile positioning, thereby limiting the adjustability of the plates. Thus, if the width of the belt is not conducive to lining up a plurality of stationary plates, full utility of the belt may not be possible. In addition to limited adjustability, prior devices offered little, if any, flotation, or acceptable operational movement, of the plates. Indeed, depending upon belt style, belt speed and belt load conditions, multidirectional stresses may be exerted on a transfer plate. Regarding prior transfer plates incorporating fingers, there may be belt forces exerted primarily in two directions: a radial force may be caused by the belt acting on the bottom surface of the fingers, thereby exerting an upward force; and, a lateral force may be caused by loss of precise belt tracking. Prior devices relied on primarily the flexibility of the fingers of prior devices to withstand the applied forces, thereby leading to an increase in the breakage rate where the flexibility of the plate material cannot cope with the applied multidirectional forces. Finally, along with the limited adjustability and lack of multidirectional flotation, prior devices may result in significant machine downtime because of required tooling for replacement. That is, a qualified repair person may be required if the machine operator is not familiar with, or capable of, replacing worn or broken interface plates. If the machine must be shut down while waiting for the qualified repair person, significant productivity is lost.

At least one improvement has been made over the standard threaded fastener connection between prior transfer plate devices and their support structures. The improvement included the use of a flanged U-shaped channel mounting structure, normally referred to as a DIN, or top-hat, rail mounting structure. While a DIN rail removes the tool requirement from the transfer plate replacement equation, such mounting structure does not offer desirable flotation of the transfer plate. That is, prior plates mounted to a DIN rail utilize an opposing clip structure that secures the plates to the DIN rail. Such attachment does not allow any flotation, or positional variance, of the finger plate with respect to the support structure.

Therefore, the art of transferring materials to or from conveyor belts would be benefited by a transfer plate and cooperating support structure that eliminates the need for tools during plate replacement while simultaneously reducing the frequency of replacement situations caused by breakage and, in the event of breakage, reduces machine downtime.

SUMMARY

A method according to the present invention provides a transfer plate and cooperating support structure that eliminates the need for tools during plate replacement while simultaneously reducing the frequency of replacement situations caused by breakage and, in the event of breakage, reduces machine downtime.

BRIEF DESCRIPTION OF THE DRAWINGS

FIG. 1A is a perspective view of a first embodiment of a transfer plate according to the present invention.

FIG. 1B is a perspective view of a second embodiment of a transfer plate according to the present invention.

FIG. 13 is a perspective view of the embodiment of FIG. 12 interfaced to the second conveyor belt of FIG. 10, further including product transferred by the belt.

DESCRIPTION OF THE PREFERRED EMBODIMENT

Figure 2:
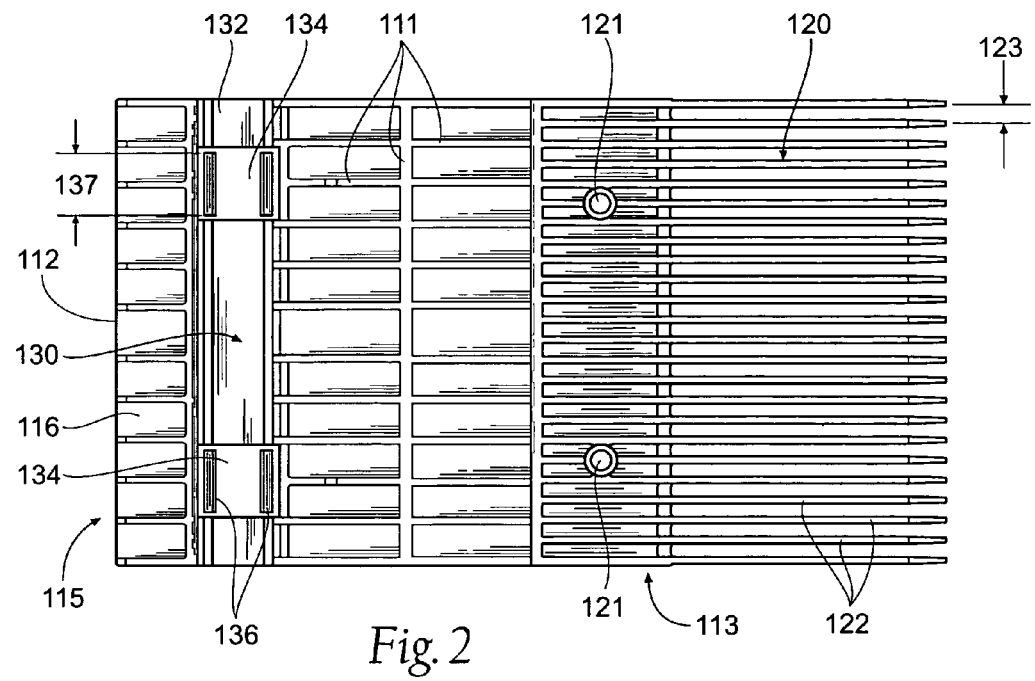
FIG. 2 is a bottom plan view of the embodiment of FIG. 1.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Turning now to the Figures, FIG. 1A provides an embodiment 100 of a transfer plate according to the present invention. Generally, the plate 100 includes a support member 110 and a transfer extension 120 depending from the support member 110. The transfer extension 120 may be formed integrally with the support member 110 or may be mechanically or adhesively coupled to the support member 110. The transfer extension 120 in FIG. 1A has been formed integrally with the support member 110. A preferred material for forming a transfer plate according to the present invention is a thermoplastic material, such as a polypropylene/polycarbonate blend. Such formation can be achieved by any process now known, such as injection molding, or later developed. In this embodiment 100, the support member 110 comprises a generally planar plate 112 having a top surface 114 and a bottom surface 116 (see FIG. 2). The top surface 114 is preferably formed, or otherwise provided such as by machining, with a plurality of grooves 118. The bottom surface 116 may be provided with a reinforcement means 111 such as reinforcement ribs. The support member 110 generally includes two ends, a transfer end 113 and a support end 115. The transfer extension 120 of this embodiment 100 includes a plurality of fingers 122 extending away from the transfer end 113. Each finger 122 has a top surface 124, a bottom surface 126 and a tip 128. The top surface 124 of the fingers 122 is preferably coplanar with the top surface 114 of the support plate 112. The tip 128 of the fingers 122 transitions into the top and bottom surfaces 124,126 through a tip angle δ (see FIG. 3), preferably an angle of between ten and twenty degrees, and more preferably an angle of thirteen degrees. The fingers 122 are preferably spaced by a finger spacing 123 (see FIG. 2). Further attached to the support member 110 of the plate 100 is a support coupler 130. While the coupler 130 may be provided separately and fastened to the support member 110, a preferred coupler 130 is formed integrally with the support member 110 depending from the bottom surface 116 of the plate 112.

FIG. 1B provides a second embodiment 160 of the present invention. This embodiment 160 includes a support coupler 130 that is in the form of a modular channel 162 provided separately from the support plate 112, as opposed to being formed integrally therewith. The modular channel 162 may be mechanically or adhesively joined to the support member 110. The support member 110 may comprise a portion of an existing interface plate not previously adapted to offer multidirectional flotation. Also shown in this Figure is a transfer extension 120 in the form of a modular finger insert 164 provided separately from the support plate 112, as opposed to being formed integrally therewith. The modular finger insert 164 may be mechanically or adhesively joined or otherwise bonded to the support member 110. While the separate support coupler 130 and separate transfer extension 120 are shown as being components of the same embodiment 160, it is to be understood that a separate support coupler 130 could be provided and coupled to an interface plate having the transfer extension 120 integrally formed and vice versa.

This embodiment 160, like the first embodiment, has a support member 110 and a transfer extension 120. However, each is slightly different than the corresponding structure of the first embodiment 100. The support member 110 of the second embodiment 160 is preferably formed with a top surface 166 including a recessed portion 166a, thereby exposing optional through-holes 121 (seen also in FIG. 2) extending partially through the support plate 112 from the bottom surface 116. The transfer extension 120 is also different than that provided in the first embodiment 100. The transfer extension 120 of this embodiment 160 is comprised of the modular finger insert 164, which is then mechanically or adhesively coupled to the support member 110. The modular finger insert 164 is preferably mechanically coupled to the support member 110 by use of threaded fasteners 161 in cooperation with flanged collets 163, through countersunk apertures 165, provided through the modular finger insert 164, and support member through-holes 121. While many sufficiently rigid materials are available, the modular finger insert 164 is preferably formed from a high strength thermoplastic material. If the modular finger insert 164 is broken, or otherwise requires removal or replacement, the entire transfer plate 160 may be removed and replaced, and the modular finger insert 164 of the removed plate 160 can be replaced while the machine from which it was removed is running, thereby limiting machine downtime.

Figure 3:
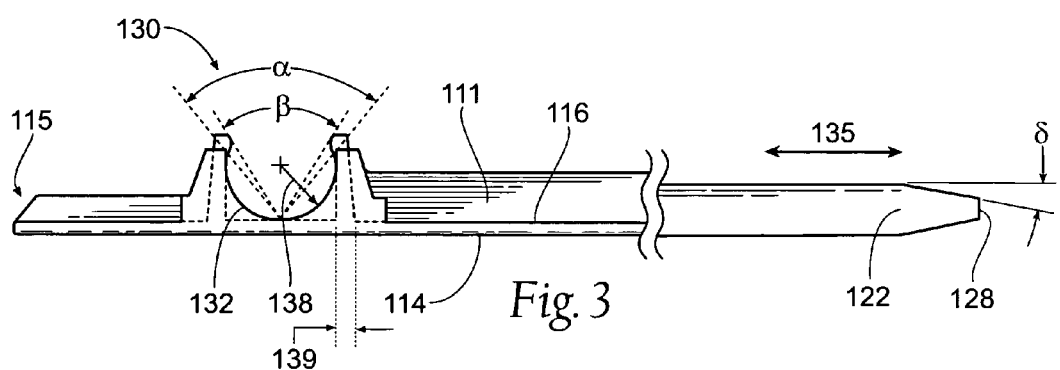
FIG. 3 is a partial cutaway inverted right elevation view of the embodiment of FIG. 1.

FIGS. 2 and 3 provide views of a preferred support coupler 130 in greater detail. This embodiment of a coupler includes a longitudinal channel 132 formed to interface with a predetermined support structure 200 (shown in FIG. 4). The channel 132 may be substantially partially circular in cross-section having a radius 138, which may be of any desirable size adapted to interface to a predetermined support structure. The channel 132 depends from preferably the bottom surface 116 of the support plate 112 and is accessible through a first insertion angle α. Substantially coaxial with the channel 132, which runs preferably substantially perpendicular to a transfer direction 135 of product onto or off from the plate 100, the support coupler 130 may include at least one, but preferably two, retainer clips 134. Each retainer clip 134 includes opposing retainer tabs 136, which are generally biased towards each other, acting as a preferred bushing when the tabs 136 extend at least partially about a support structure. The biased tabs 136 provide access to the channel 132 through a second insertion angle β, which, for example, may be sixty degrees. Preferably, the first insertion angle α is larger than the second insertion angle β. The bias and width 137 of the tabs 136 may be changed to achieve desired frictional resistance. That is, the more severely the tabs 136 are biased towards each other and the wider the tabs 136, the more frictional resistance to radial plate motion and plate sliding motion would be provided. The thickness 139 of the tabs 136 may be adjusted to achieve desired mounting force. A greater thickness 139 of the tabs 136 generally requires more effort to mount the clips 134 to a support structure, because the added material increases rigidity of the tabs 136. For example, in one application, a certain radial frictional resistance may be wanted to allow radial plate flotation about a support structure, such as the support rod 202 of FIG. 4, and also to allow an axial flotation along the rod 202, parallel to the rods central longitudinal axis.

Figure 4:
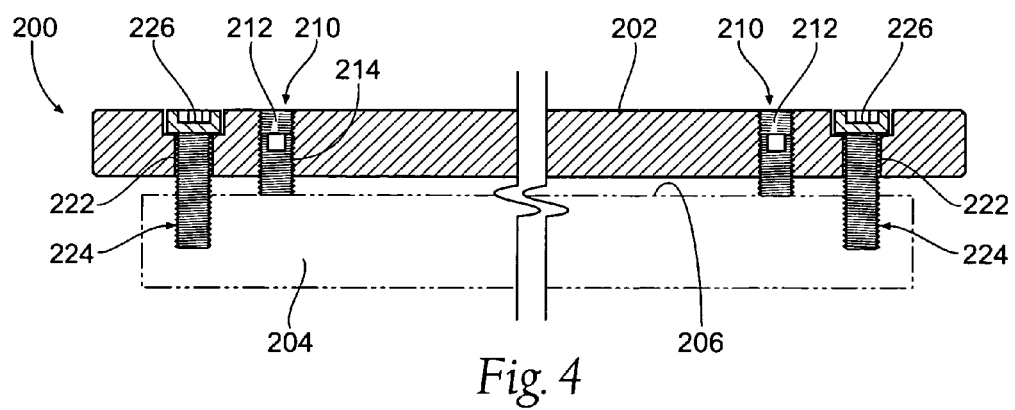
FIG. 4 is a partial front elevation cross-section view of a first embodiment of a support structure according to the present invention, taken along line 4-4 in FIG. 5.

FIG. 4 depicts an embodiment 200 of a support structure according to the present invention. In the representative embodiment shown, the support structure 200 may be a substantially cylindrical rod 202 stationarily supported upon a support block 204. Acting on the support rod 202 are a leveling means 210 and an attachment means 220. The leveling means 210 preferably includes at least two threaded apertures 212 spaced along a length of the rod 202. Cooperating with the threaded apertures 212 are threaded leveling screws 214. The fastening means 220 includes at least two countersunk smooth bores 222 formed through the rod 202. Aligned generally coaxially with the formed smooth bores 222 in the rod 202 are threaded apertures 224 formed in the support block 204. Fastening screws 226 may be inserted through the smooth bores 222 in the rod 202 and threaded into the threaded apertures 224 in the support block 204 to maintain the rod 202 in a desired relative position. Several rod sections may be concatenated to form a continuous support rod 202 to accommodate a desired width and number of plates 100. Such concatenation may be made possible by rod sections having mating ends, such as male/female dowelling or threads.

Figure 5:
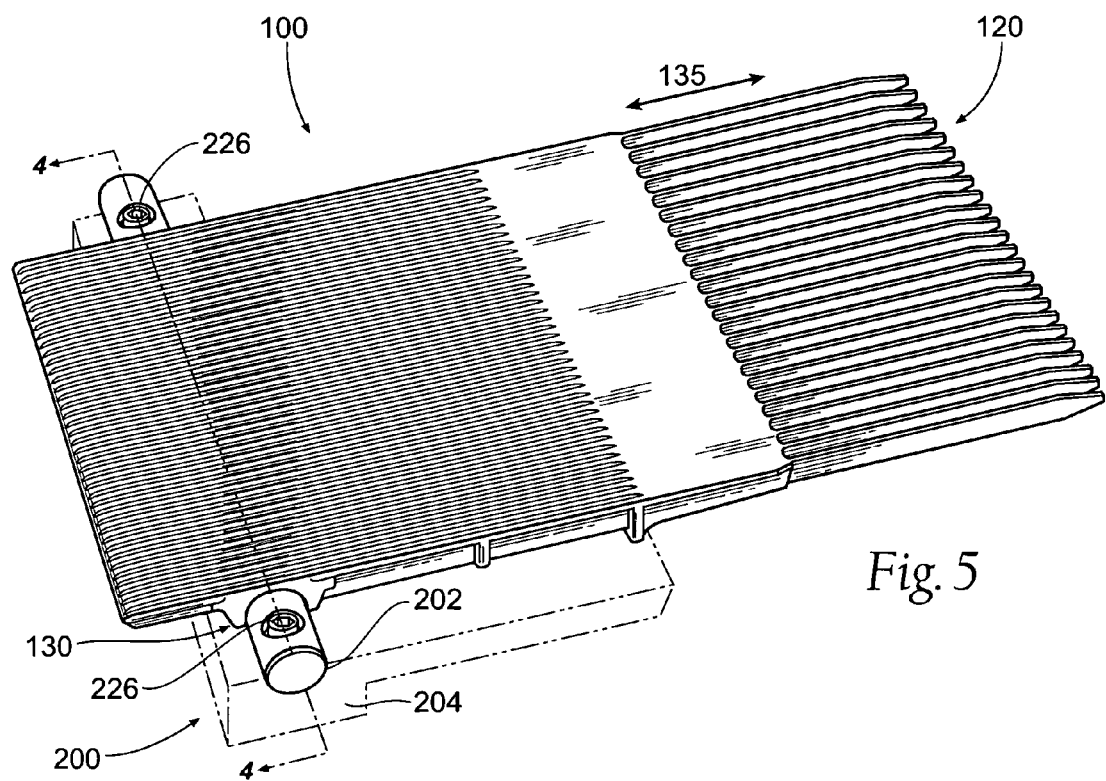
FIG. 5 is a perspective view of the plate of FIG. 1 situated on the first embodiment of a support structure.

To level the support rod 202 of the support structure 200, the fastening screws 226 are first loosened. The leveling screws 214 cooperate with the threaded apertures 212 in the rod 202 and a leveling surface 206 of the support block 204. The leveling screws 214 are then tightened or loosened to level the rod 202. When a desired level has been reached, the fastening screws 226 are then tightened to maintain the desired position. While a number of different orientations of the leveling means 210 and the attachment means 220 are possible, if utilized as in the depicted embodiment, it is generally desirable to maintain the leveling means 210 in relatively close proximity to the attachment means 220 to minimize variations in the level due to flexing of the rod 202. FIG. 5 shows the embodiment 100 of FIG. 1 coupled to the support structure 200 of FIG. 4 by the support coupler 130 of FIG. 3.

Figure 6:
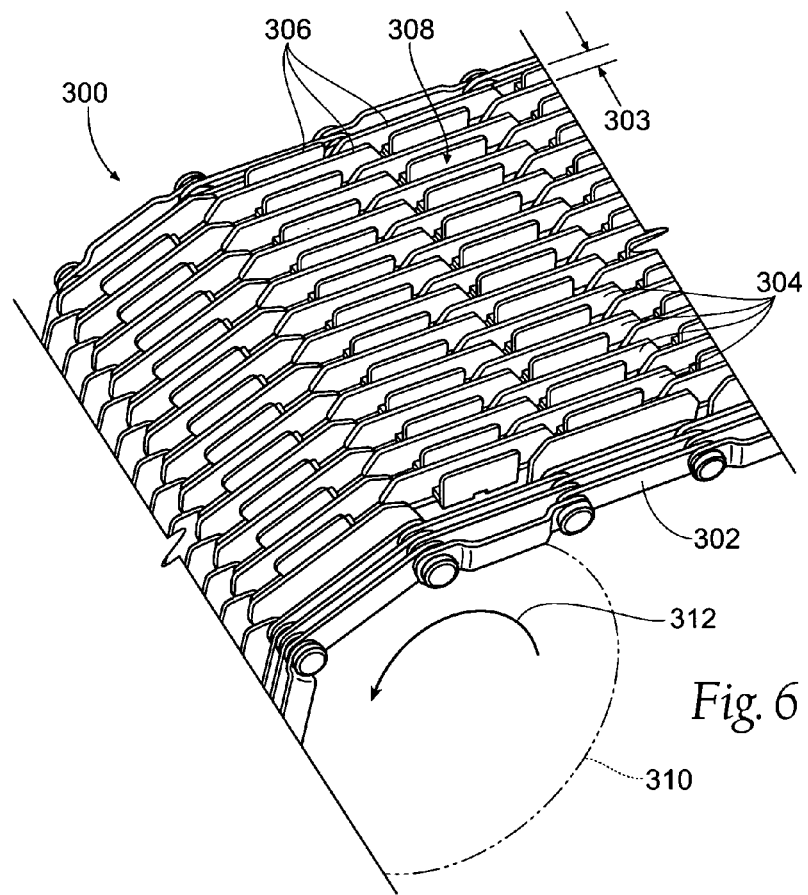
FIG. 6 is a partial cutaway perspective view of a first conveyor belt.

A transfer plate according to the present invention may be required in a system using a first conveyor belt 300, as shown in FIG. 6. An example of this type of raised-rib belt is the Combinox belt offered by Twentebelt B.V., of the Netherlands. The view in FIG. 6 is scaled down to illustrate the invention, since belts used in such manufacturing processes can be tens of feet wide and hundreds of feet long. The belt 300 includes a linked carriage 302, generally formed from linked metal elements, and a plurality of upstanding raised ribs 304 extending outward from the carriage 302. The ribs 304 extend along a length, generally parallel to the direction of belt travel. The ribs 304 each have a top surface 306. The rib top surfaces 306, collectively, form a transfer surface 308. Adjacent rows of ribs 304 are spaced laterally across the belt 300 by a measurable rib spacing 303, which is substantially similar to the finger spacing 123 of the plate 100. Alternatively, the finger spacing 123 may be a multiple of the rib spacing 303, if a finger 122 is not desired between each row of raised ribs 304. The belt 300. is driven by a drive mechanism 310, as is known in the art, which forms no part of the present invention. The drive mechanism 310 is pictured as rotating in a counter-clockwise direction 312.

Figure 7:
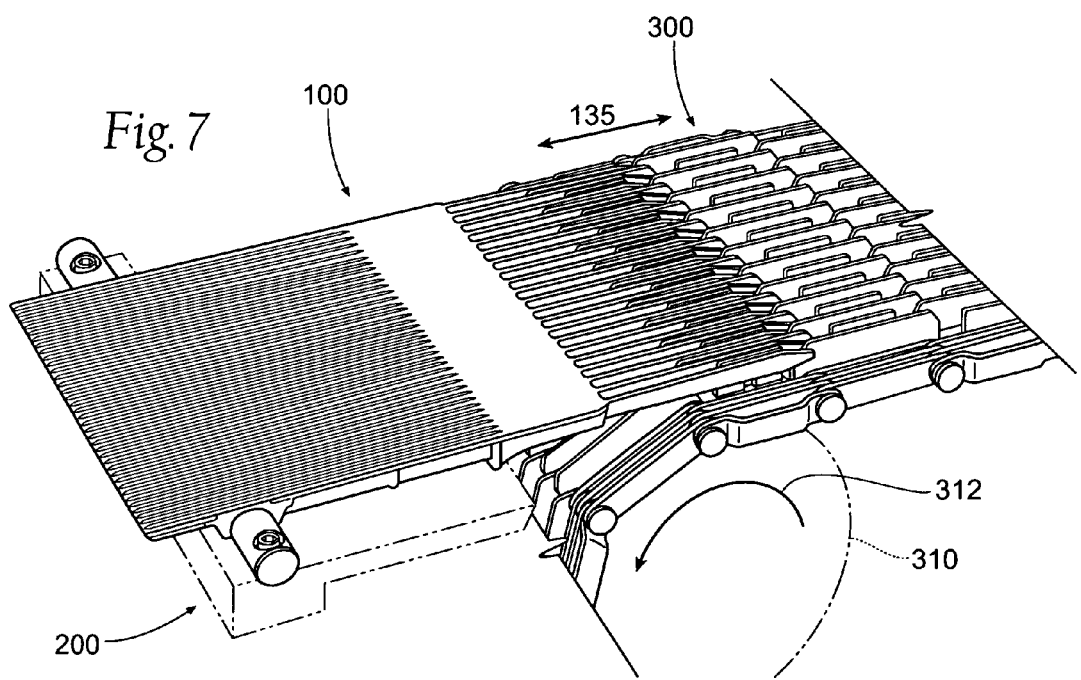
FIG. 7 is a perspective view of the plate of FIG. 1 situated on the support structure of FIG. 4, interfaced with the belt of FIG. 6.

FIG. 7 shows the embodiment 100 of FIG. 1 supported by the support structure 200 of FIG. 4 interfaced to the belt 300 of FIG. 6. The support structure 200 has been situated at a desired relative position to the belt 300. The plate 100 has been placed on the support structure 200 and the fingers 122 have been inserted between the rows of raised ribs 304. Since the finger spacing 123 of the plate 100 is substantially similar to the rib spacing 303 of the belt 300, or multiples thereof, the fingers 122 can easily slide between the adjacent rows of ribs 304. While shown as placed on the out feed end of the belt 300, it is understood that the plate 100 could instead be placed on the in feed end, as well.

Figure 8:
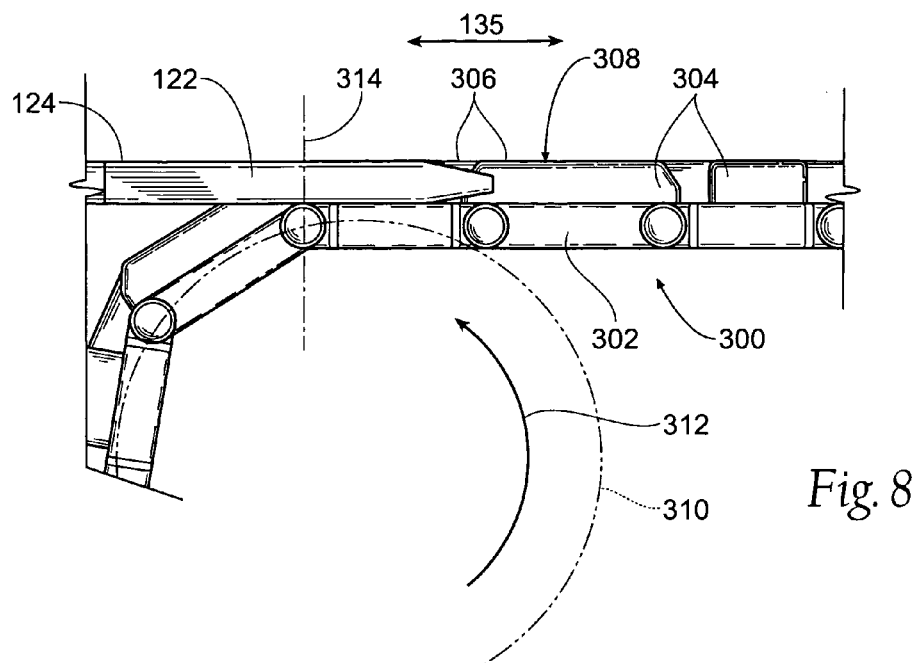
FIG. 8 is a partial cutaway left elevation view of the arrangement of FIG. 7.

FIG. 8 is a side elevation view of the arrangement of FIG. 7. When the fingers 122 are inserted into the structure of the belt 300, preferably between rows of ribs 304, the top surface 124 of the fingers is preferably substantially coplanar with the transfer surface 308 formed by the top surfaces 306 of the ribs 304. Furthermore, when inserted, the fingers 122 preferably extend into the belt 300, beyond the breakpoint 314 of the linked carriage 302. That is, as the linked carriage 302 travels around the drive mechanism 310, each successive link will bend, thereby causing a break in the plane of the transfer surface 308. The fingers 122 extend into the belt 300 structure such that there exists a relatively seamless transition between the belt transfer surface 308 and the top surface 124 of the fingers 122. This type of transition is preferable as it minimizes plate oscillation and allows smooth product transfer.

Figure 9:
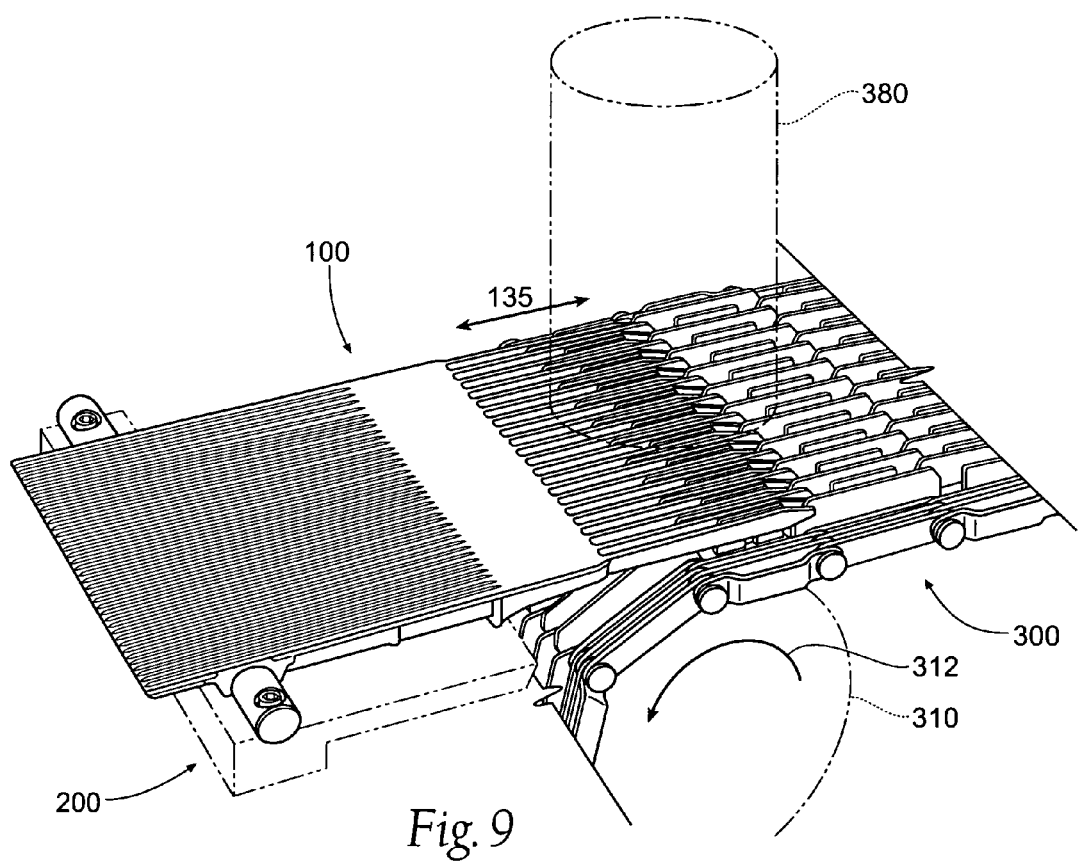
FIG. 9 is an alternate perspective view of the arrangement of FIG. 7, further including product transferred by the belt.

FIG. 9 is a perspective view of the arrangement of FIG. 7, further including a product 380 to be out fed from the belt 300.

Figure 11:
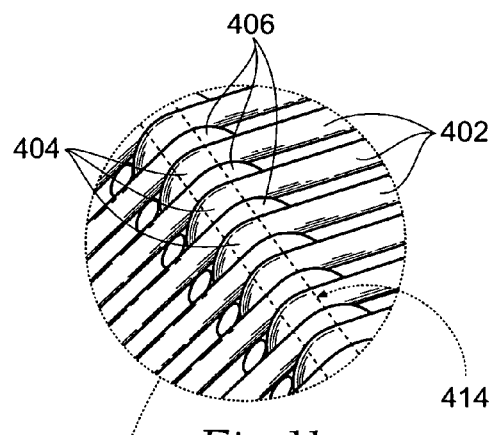
FIG. 11 is an alternate partial cutaway perspective view of the belt of FIG. 10.
Figure 10:
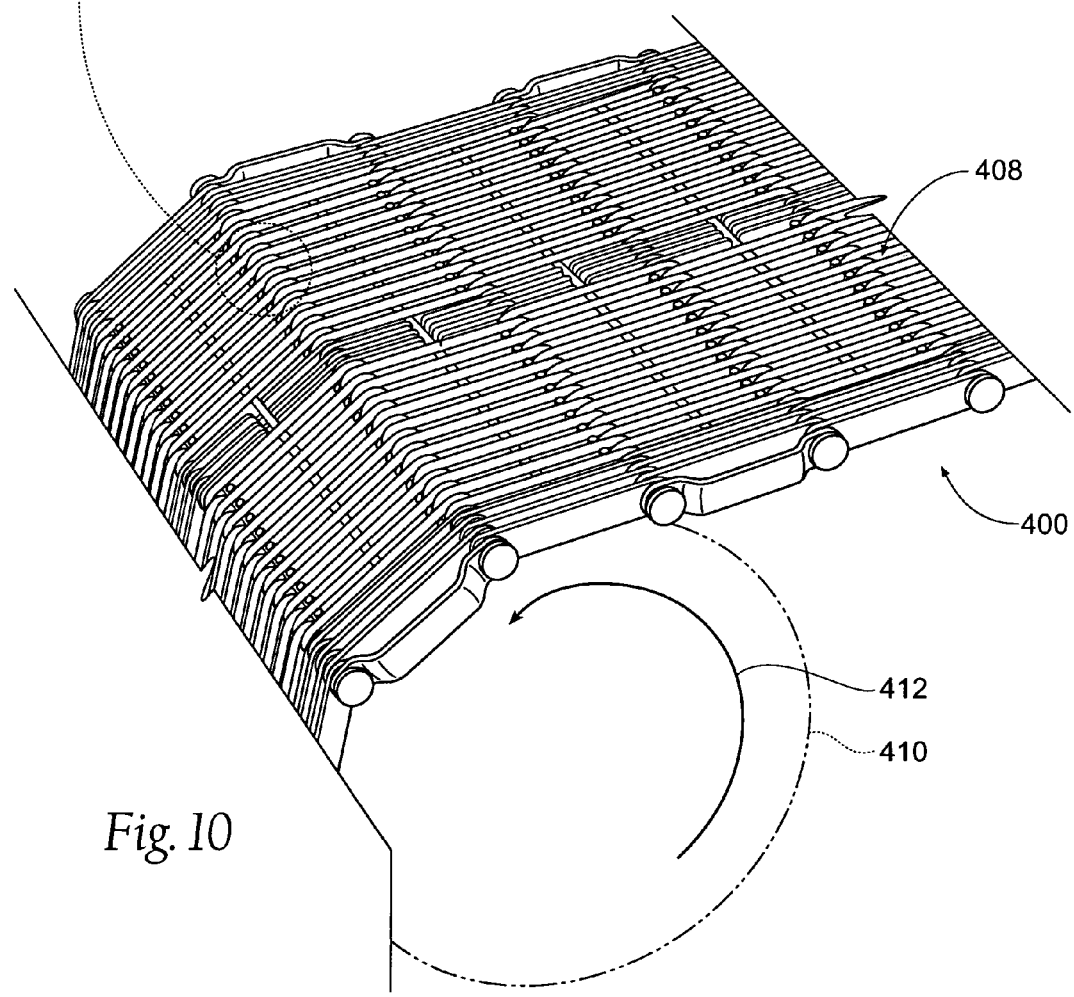
FIG. 10 is a partial cutaway perspective view of a second conveyor belt.

A second type of conveyor belt 400 is shown in FIG. 10. An example of this type of belt is an Eyelink-to-Eyelink belt, also offered by Twentebelt B.V., of the Netherlands. This belt 400 includes a structure similar to the linked carriage 302 of the Combinox belt 300. The belt 400 is comprised of a plurality of metal links 402 having a front loop 404, a rear loop 406 and a top surface 408. Generally, the front loop 404 of a given link 402 is rotatably coupled to the rear loop 406 of each adjacent link 404, as can be more clearly seen in FIG. 11. The top surfaces 408, collectively, of the links 402 create a generally planar transfer surface 408 while the belt 400 is traveling over a distance. However, unlike the Combinox belt 300, which included rib spacing 303 between the ribs 304 and beneath the transfer surface 308, this belt 400 provides a transfer surface 408 that is essentially uninterrupted, thereby preventing insertion of finger structures, similar to those 122 of the first embodiment 100, under the transfer surface 408. Although an eyelink belt 400 is described, it is to be understood that such generally uninterrupted transfer surface 408 may also be provided by other belt structures in which there is insufficient space beneath the transfer surface 408 to include fingers, such as an endless, flexible imperforate belt or a belt comprising a plurality of hinged plates.

Figure 12:
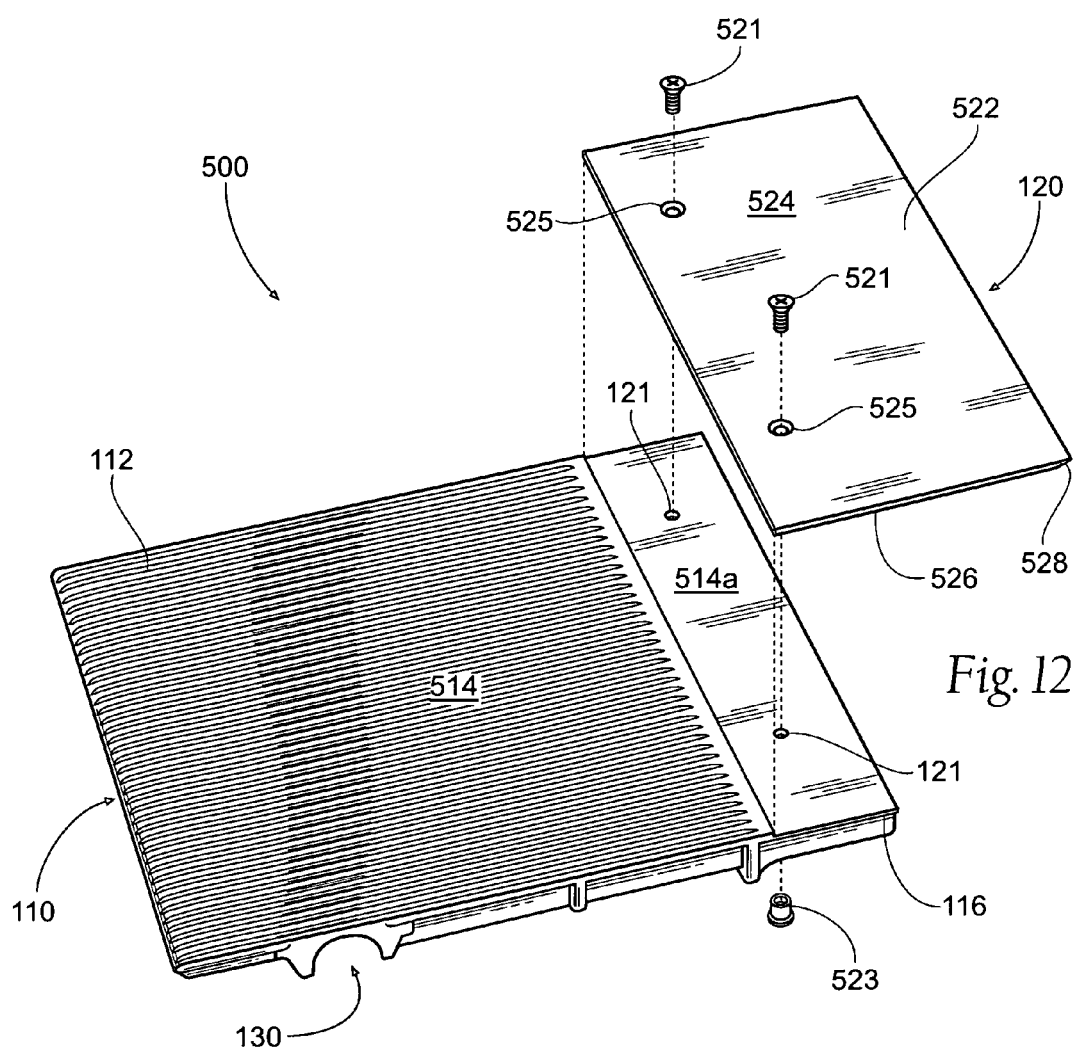
FIG. 12 is a perspective view of a third embodiment of a transfer plate according to the present invention.

While a finger structure could be used if spaced from the belt 400, it is desirable, instead, to use a relatively planar transfer extension 120 in such a case. FIG. 12 provides a third embodiment 500 of a transfer plate according to the present invention. This embodiment 500, like the first embodiment, has a support member 110 and a transfer extension 120. However, each is slightly different than the corresponding structure of the first embodiment 100. The support member 110 of the second embodiment 500 is preferably formed with a top surface 514 including a recessed portion 514a, thereby exposing the optional through-holes 121 extending partially through the support plate 112 from the bottom surface 116. The transfer extension 120 is also different than that provided in the first embodiment 100. The transfer extension 120 of this embodiment 500 is comprised of a modular interface plate 522, which is then mechanically or adhesively coupled to the support member 110. The modular interface plate 522 has a top surface 524, a bottom surface 526 and a leading edge 528. The modular interface plate 522 is preferably mechanically coupled to the support member 110 by use of threaded fasteners 521 in cooperation with flanged collets 523, through countersunk apertures 525 provided through the plate 522 and support member through-holes 121. The bottom surface 526 cooperates with a portion of the support plate recessed portion 514a, and the top surface 524 is preferably coplanar with the top surface 114 of the support member 110. While many sufficiently rigid materials are available, the plate 522 is preferably formed from stainless steel, which may be embossed to reduce friction. If the plate 522 is deformed, or otherwise requires removal or replacement, the entire transfer plate 500 may be removed and replaced, and the modular interface plate 522 can be replaced while machine is running, thereby limiting machine downtime.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A method for interfacing a plate to a conveyor belt, said method comprising the steps of:
   providing a substantially planar plate having a top surface oppositely disposed from a bottom surface; and
   coupling said plate to a support structure positioned relative to a conveyor belt, said plate being coupled to said support structure in a rotational relationship about a rotation axis, and said plate spanning a distance between at least a portion of said support structure and said conveyor belt,
   wherein said support structure comprises a cylindrical rod and said coupling step comprises the step applying pressure to said plate in a direction perpendicular to said rotation axis to cause rotational engagement of said plate with said support structure.

2. A method according to claim 1, said plate comprising a support member and a transfer extension.

3. A method according to claim 1, said plate including a support coupler including a channel disposed on said bottom surface of said plate and said applying step is performed without the use of a tool.

* * * * *